United States Patent
Shin

(10) Patent No.: US 7,979,073 B2
(45) Date of Patent: Jul. 12, 2011

(54) APPARATUS AND METHOD FOR SOLVING CONGESTION IN WIDEBAND CODE DIVISION MULTIPLE ACCESS SYSTEM

(75) Inventor: Sang-Min Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 741 days.

(21) Appl. No.: 11/874,572

(22) Filed: Oct. 18, 2007

(65) Prior Publication Data

US 2008/0117812 A1   May 22, 2008

(30) Foreign Application Priority Data

Nov. 17, 2006   (KR) ........................ 10-2006-0113719

(51) Int. Cl.
*H04W 36/00* (2009.01)
*H04W 40/00* (2009.01)

(52) U.S. Cl. ................... 455/443; 455/439; 455/445

(58) Field of Classification Search .............. 455/449, 455/453, 444, 439, 550.1, 552.1, 553.1, 556.1, 455/443

See application file for complete search history.

(56) References Cited

U.S. PATENT DOCUMENTS

| | | | |
|---|---|---|---|
| 6,690,939 B1* | 2/2004 | Jonsson et al. | 455/453 |
| 7,433,698 B2* | 10/2008 | Marjelund et al. | 455/462 |
| 7,643,786 B2* | 1/2010 | Soderbacka et al. | 455/3.01 |
| 2002/0105927 A1* | 8/2002 | Holma et al. | 370/331 |
| 2005/0215246 A1* | 9/2005 | Soderbacka et al. | 455/426.1 |
| 2006/0221903 A1* | 10/2006 | Kauranen et al. | 370/331 |

FOREIGN PATENT DOCUMENTS

| | | |
|---|---|---|
| JP | 1996-008040 | 1/1996 |
| KR | 1020020089628 | 11/2002 |
| KR | 1020040098304 | 11/2004 |
| KR | 100703291 | 3/2007 |
| WO | WO 2006/052169 | 5/2006 |

* cited by examiner

Primary Examiner — Tilahun Gesesse

(74) Attorney, Agent, or Firm — The Farrell Law Firm, P.C.

(57) ABSTRACT

Provided is an apparatus and method for solving congestion in a Wideband Code Division Multiple Access (WCDMA) system. A WCDMA node B broadcasts a congestion occurrence information message over a cell area when congestion is sensed. A mobile communication terminal then checks the type of service to receive in the WCDMA node B and, when the mobile communication terminal receives a circuit service and there is a Global System for Mobile Communication (GSM)/General Packet Radio Services (GPRS) cell available with which the mobile communication terminal can communicate, it switches its service cell mode from a WCDMA cell into the GSM/GPRS cell.

15 Claims, 3 Drawing Sheets

APPARATUS AND METHOD FOR SOLVING CONGESTION IN WIDEBAND CODE DIVISION MULTIPLE ACCESS SYSTEM

PRIORITY

This application claims priority under 35 U.S.C. §119 to an application filed in the Korean Intellectual Property Office on Nov. 17, 2006 and assigned Serial No. 2006-113719, the contents of which are incorporated herein by reference.

BACKGROUND OF THE INVENTION

1. Field of the Invention

The present invention relates generally to an apparatus and method for solving congestion in a Wideband Code Division Multiple Access (WCDMA), and in particular, to an apparatus and method for solving congestion in a WCDMA system by switching the service cell mode of mobile communication terminals belonging to both a WCDMA cell and a Global System for Mobile Communication (GSM)/General Packet Radio Services (GPRS) cell among mobile communication terminals into the GSM/GPRS cell, upon a request for a circuit service, when congestion occurs in a base station of the WCDMA system.

2. Description of the Related Art

Current mobile communication systems have advanced beyond the initial speech-based service, and now provide high-speed and high-quality radio data packet communication systems for data and multimedia services. Particularly, a Universal Mobile Telecommunication Service (UMTS) system, which is the third-generation (3G) mobile communication system, is constructed based on GSM and GPRS, which are European mobile communication systems, and adopts WCDMA technology. The UMTS system provides a consistent service of transmitting packet-based texts, digital speech data, video data and/or multimedia data at a transmission rate of over 2 Mbps to users of mobile phones or computers, regardless of user location.

The UMTS system is composed of a Core Network (CN) and a plurality of Radio Network Subsystems (RNS). The RNSs constitute a UMTS Terrestrial Radio Access Network (UTRAN). Each of the RNSs is composed of a Radio Network Controller (RNC) and a plurality of base stations, i.e., node B. The RNCs are divided into a Serving RNC (SRNC), a Drift RNC (DRNC) and a Control RNC (CRNC) according to their role. The serving RNC manages information of a User Equipment (UE) and transmits/receives data to/from the core network. The drift RNC directly and wirelessly accesses the user equipment. The control RNC controls radio resources of each node B.

The RNCs allocate radio resources to a plurality of node Bs that they manage, and the node Bs substantially provide the allocated radio resources from the RNCs to UEs. The radio resources provided by each node B are formed for each cell and signify radio resources of a particular cell managed by the corresponding node B. The UE sets up a radio channel based on the radio resources of the particular cell managed by the node B, and transmits/receives data through the established radio channel. Since the UE recognizes only a physical channel formed for each cell, it is meaningless to distinguish a node B from a cell. Therefore, the terms node B and cell will be used interchangeably and have the same meaning in the present specification.

Meanwhile, there are many regions where a WCDMA cell is overlapped with a GSM/GPRS cell in a downtown area. When congestion occurs, a WCDMA node B passes over a mobile communication terminal caught in the middle of speech communication in the overlapped region into the GSM/GPRS cell by performing handover, and a conventional WCDMA node B passes over a mobile communication terminal into a GSM/GPRS cell through cell reselection. When a user uses a speech service after the cell switching, there is no difference in the quality of service whether the mobile communication belongs to the WCDMA cell or the GSM/GPRS cell. However, when the user uses a packet service such as the Internet, the user cannot receive the high-speed packet service, which is the advantage of the WCDMA system.

Accordingly, there is needed an apparatus and method for switching the service cell mode of a mobile communication terminal from a WCDMA cell into a GSM/GPRS cell according to the type of service requested by the user, when congestion occurs in the WCDMA node B.

SUMMARY OF THE INVENTION

An aspect of the present invention is to substantially solve at least the above problems and/or disadvantages and to provide at least the advantages below. Accordingly, an aspect of the present invention is to provide an apparatus and method for solving congestion while maintaining advantages of a WCDMA service in a WCDMA system.

An aspect of the present invention is to provide an apparatus and method for solving congestion in a WCDMA system by selectively switching the service cell mode of mobile communication terminals belonging to both WCDMA cell and GSM/GPRS cell into the GSM/GPRS cell among the mobile communication terminals of the WCDMA cell, when congestion occurs in a node B of the WCDMA system.

An aspect of the present invention is to provide an apparatus and method for solving congestion in a WCDMA system by selectively switching the service cell mode of mobile communication terminals belonging to both WCDMA cell and GSM/GPRS cell into the GSM/GPRS cell and requesting for a circuit service among the mobile communication terminals of the WCDMA cell, when congestion occurs in a node B of the WCDMA system.

According to the present invention, in the WCDMA system capable of decreasing occurrence of congestion, a WCDMA node B broadcasts a congestion occurrence information message over a cell area upon sensing occurrence of congestion. A mobile communication terminal checks the type of a service to receive upon sensing the occurrence of congestion in the WCDMA node B and, when the mobile communication terminal receives a circuit service and there is a cell available with which the mobile communication terminal can communicate, it switches its service cell mode from a WCDMA cell into the GSM/GPRS cell.

According to the present invention, in a method for decreasing occurrence of congestion in a mobile communication terminal of a WCDMA system, the mobile communication terminal checks the type of a service to receive upon sensing occurrence of congestion in a WCDMA node B. When the service to receive is a circuit service, it checks whether there is a GSM/GPRS cell available with which the mobile communication terminal could communicate. When there is an available GSM/GPRS cell, it switches its service cell mode from the WCDMA cell into the GSM/GPRS cell.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention provides an apparatus and method for solving congestion in a WCDMA system by switching a service cell mode of mobile communication terminals belonging to a WCDMA cell and overlapped to a GSM/GPRS cell among mobile communication terminals into the GSM/GPRS cell upon a request for a circuit service, or maintaining it at the WCDMA cell upon a request for a packet service, when congestion occurs in a base station, i.e., node B, of the WCDMA system. The apparatus and method of the present invention allows a WCDMA service subscriber to enjoy the advantages of the WCDMA service while solving the problem of congestion.

In other words, there are many regions in which a cell of a WCDMA service is overlapped with a cell of a GSM/GPRS service, and the technology of the present invention solves a congestion problem of a WCDMA cell and consistently provides users with a high transmission rate, which is the intrinsic advantage of the WCDMA service, by switching the service cell mode of a mobile communication terminal of the overlapped region from a WCDMA cell into a GSM/GPRS cell when the mobile communication terminal requests for a speech service, which makes little difference in a sensed quality without regard to whether the mobile communication terminal belongs to a WCDMA cell or a GSM/GPRS cell, and maintaining it at the WCDMA cell when the mobile communication terminal requests for a packet service.

Figure 1:
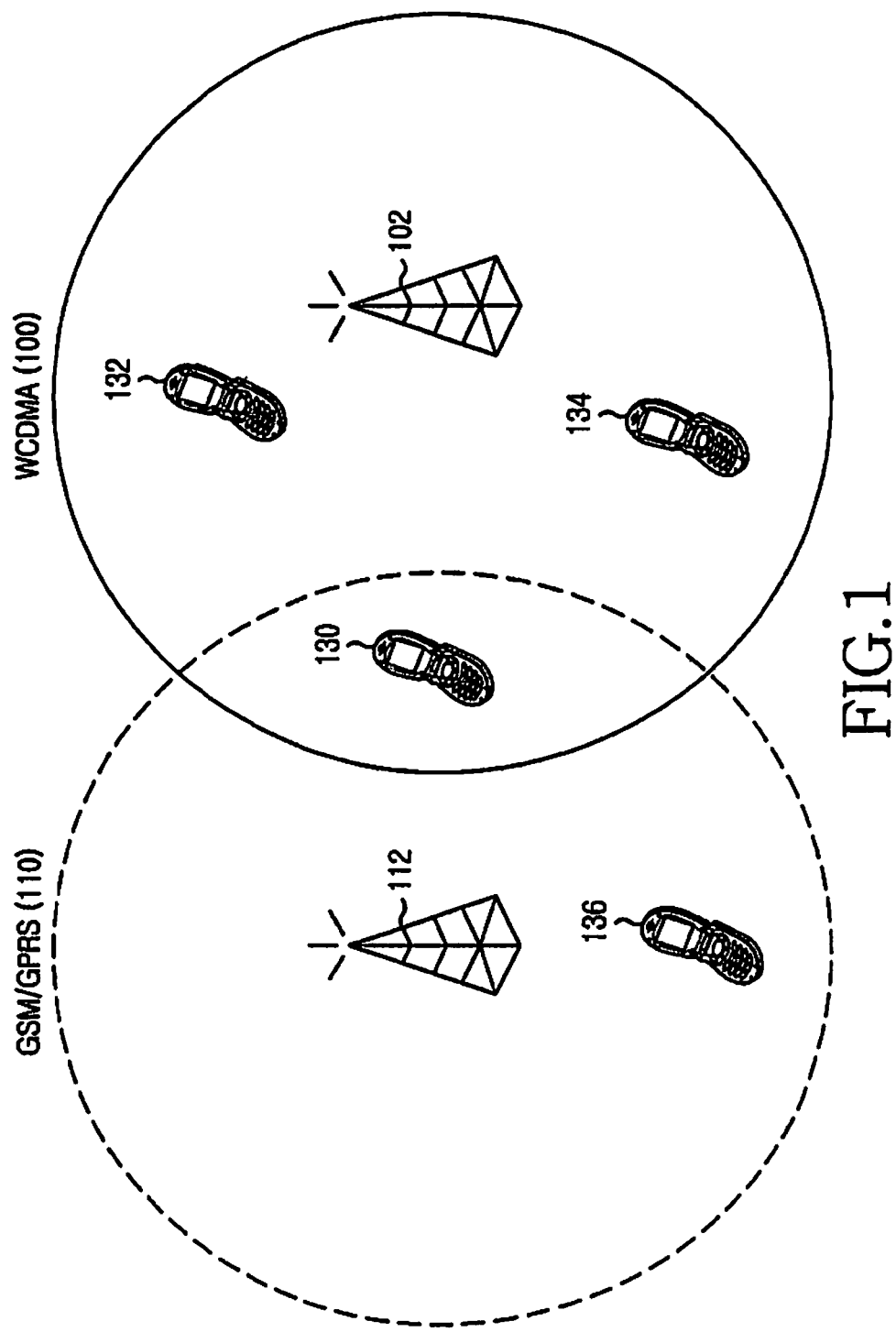
FIG. 1 illustrates a WCDMA system in which a WCDMA cell is overlapped with a GSM/GPRS cell according to the present invention.

FIG. 1 illustrates a WCDMA system in which a WCDMA cell is overlapped with a GSM/GPRS cell according to the present invention.

The WCDMA system of the present invention includes a WCDMA node B 102 and mobile communication terminals 130, 132 and 134 in a cell. When the WCDMA node B 102 is connected to many mobile communication terminals and the load applied onto the WCDMA node B 102 exceeds a threshold value, it senses congestion occurring therein. At that point, the WCDMA node B 102 broadcasts a congestion occurrence information message informing the mobile communication terminals 130, 132, and 134 of the WCDMA cell 100 that congestion has occurred in the WCDMA node B 102.

The congestion occurrence information message may include information on whether congestion has occurred in a System Information Block (SIB) type 3, and periodically broadcast the SIB type 3 to the mobile communication terminals.

When the congestion occurrence information message is broadcasted in the WCDMA cell 100, a mobile communication terminal 130 that also belongs to the GSM/GPRS cell 110 among the mobile communication terminals 130, 132 and 134, receives the congestion occurrence information message and senses the occurrence of the congestion in the WCDMA node B 102. Subsequently, when the user requests a speech service, that is, when the user attempts communication, the mobile communication terminal switches its service cell mode into the GSM/GPRS cell 110.

When the mobile communication terminal 130 is to receive a packet service, it does not switch its service cell mode and remains in the WCDMA cell 100 to receive the packet service.

Figure 2:
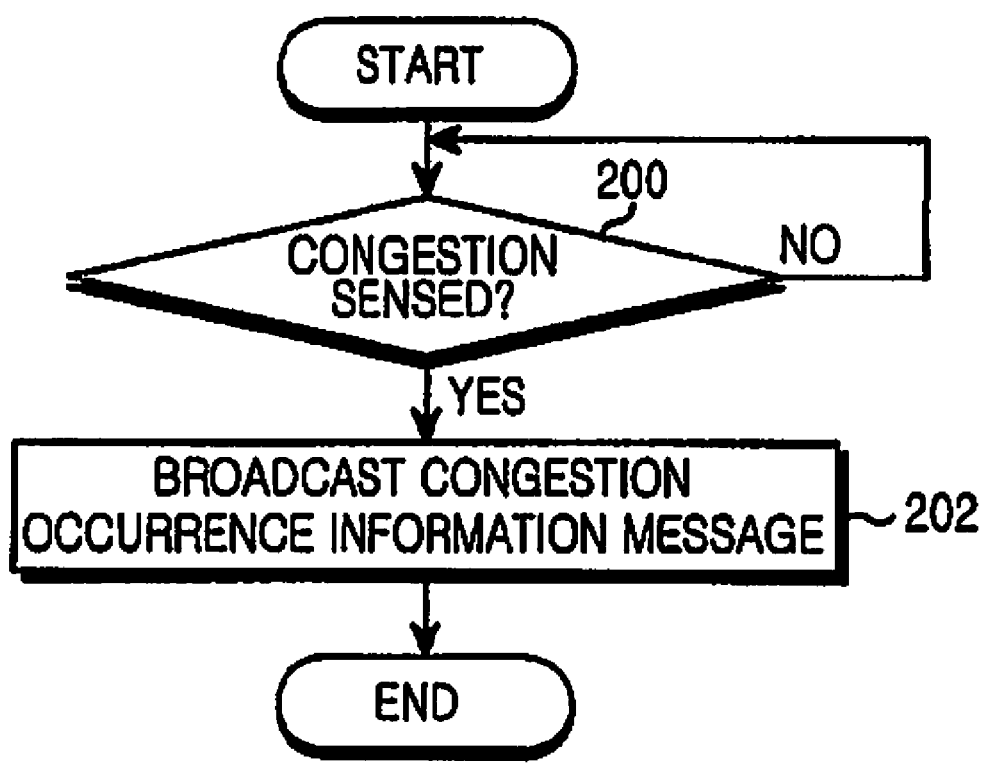
FIG. 2 illustrates a process of informing occurrence of congestion in a node B of a cell to terminals of the cell according to the present invention.

FIG. 2 illustrates a process of informing occurrence of congestion in a node B of a cell to terminals of the cell according to the present invention. Referring to FIG. 2, when the WCDMA node B is connected to many mobile communication terminals and senses occurrence of congestion as the load applied to the WCDMA node B exceeds a threshold value in step 200, the WCDMA node B broadcasts a congestion occurrence information message in step 202.

In step 202, information indicating whether congestion has occurred may be included in a broadcast message, which is broadcasted in a cell area at a period, and broadcasted instead of the congestion occurrence information message.

Figure 3:
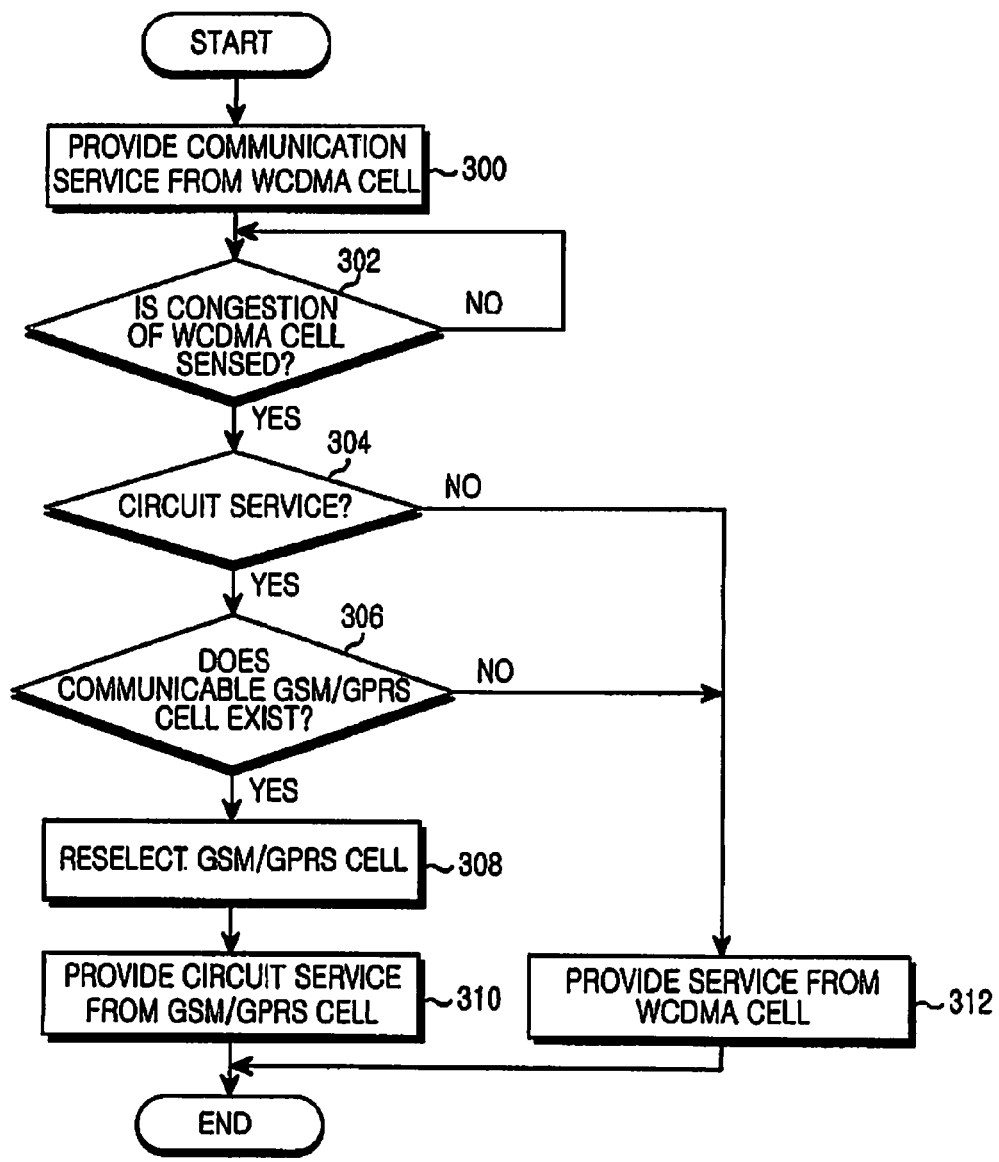
FIG. 3 illustrates a process occurring in a mobile communication terminal of the WCDMA system upon sensing congestion according to the present invention.

FIG. 3 illustrates a process occurring in a mobile communication terminal of the WCDMA system upon sensing of congestion according to the present invention.

Referring to FIG. 3, the mobile communication terminal receives a WCDMA communication service in step 300, and receives the congestion occurrence information message from the WCDMA node B in step 302 to thereby sense that congestion has occurred. Then, the mobile communication terminal remains in an idle state and checks whether the user is requesting for a circuit service or a packet service in step 304.

When the mobile communication terminal is requesting for a packet service in step 304, the mobile communication terminal does not switch its service cell mode and continues to receive the WCDMA service in step 312.

However, the mobile communication terminal is requesting for a circuit service in step 304, the mobile communication terminal determines whether there is a GSM/GPRS cell available with which the mobile communication terminal could communicate in step 306. When there is no available GSM/GPRS cell, the mobile communication terminal does not switch its service cell mode and continues to receive the WCDMA service in step 312. Herein, the mobile communication terminal may reselect another WCDMA cell, or enter a limited service mode if it is not available. The option is up to a service provider.

However, when there is an available GSM/GPRS cell in step 306, the mobile communication terminal selects the GSM/GPRS cell and switch its service cell mode into the GSM/GPRS cell in step 308, and receives the circuit service through the GSM/GPRS service.

As described above, the present invention provides an apparatus and method for switching the service cell mode of a mobile communication terminal which is one of the mobile communication terminals of a WCDMA cell and also positioned in a region overlapped with a GSM/GPRS cell upon receipt of a request for a circuit service, when congestion occurs in a node B of a WCDMA system. The apparatus and method of the present invention solves a congestion problem at the WCDMA cell and consistently provides users with a high transmission rate, which is the intrinsic advantage of the WCDMA service, by switching the service cell mode of the mobile communication terminal from the WCDMA cell into the GSM/GPRS cell when the mobile communication terminal requests for a speech service, which makes little difference in a sensed quality without regard to whether the mobile communication terminal belongs to a WCDMA cell or a GSM/GPRS cell, and maintaining the service cell mode at the WCDMA cell when the mobile communication terminal requests for a packet service.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Wideband Code Division Multiple Access (WCDMA) system for decreasing congestion, comprising:
   a WCDMA node B for broadcasting a congestion occurrence information message over a cell area upon sensing occurrence of congestion; and
   a mobile communication terminal for checking a service to receive, upon receiving the congestion occurrence information message from the WCDMA node B, and for switching a service cell mode of the mobile communication terminal from a WCDMA cell into a Global System for Mobile Communication (GSM)/General Packet Radio Services (GPRS) cell when the mobile communication terminal receives a circuit service and there is an available GSM/GPRS cell with which the mobile communication terminal can communicate.

2. The WCDMA system of claim 1, wherein when the service to receive is a packet service, the mobile communication terminal does not perform switching the service cell mode, and receives the packet service from the WCDMA cell.

3. The WCDMA system of claim 1, wherein when the service to receive is the circuit service and there is no GSM/GPRS cell available to communicate with the mobile communication terminal, the mobile communication terminal does not perform switching the service cell mode and continues to receive the circuit service from the WCDMA cell.

4. The WCDMA system of claim 1, wherein the congestion occurrence information message comprises a broadcast message informing mobile communication terminals of the WCDMA cell that the congestion occurs in the WCDMA node B.

5. The WCDMA system of claim 1, wherein the congestion occurrence information message comprises a broadcast message including information indicating whether the congestion occurs, which is periodically broadcasted in the WCDMA cell area.

6. The WCDMA system of claim 1, wherein the congestion occurrence information message comprises a System Information Block (SIB) type 3 including information indicating whether the congestion occurs.

7. A method for decreasing occurrence of congestion in a mobile communication terminal of a Wideband Code Division Multiple Access (WCDMA) system, comprising:
   checking a type of a service to receive in the mobile communication terminal, upon receiving a congestion occurrence information message from a WCDMA node B;
   checking, when the service to receive is a circuit service, whether there is a Global System for Mobile Communication (GSM)/General Packet Radio Services (GPRS) cell available with which the mobile communication terminal can communicate; and
   switching, when there is an available GSM/GPRS cell, a service cell mode of the mobile communication terminal from the WCDMA cell into the GSM/GPRS cell.

8. The method of claim 7, further comprising:
   receiving a packet service from the WCDMA cell without switching the service cell mode, when the service to receive is the packet service.

9. The method of claim 7, further comprising:
   receiving the circuit service from the WCDMA cell without switching the service cell mode, when the service to receive is the circuit service but there is no GSM/GPRS cell available with which the mobile communication terminal could communicate.

10. The method of claim 7, wherein the congestion occurrence information message is broadcasted by the WCDMA node B.

11. The method of claim 7, wherein the congestion occurrence information message comprises a broadcast message informing mobile communication terminals of the WCDMA cell that congestion occurs in the WCDMA node B.

12. The method of claim 7, wherein the congestion occurrence information message comprises a broadcast message including information indicating whether the congestion occurs, which is periodically broadcasted in the WCDMA cell area.

13. The method of claim 7, wherein the congestion occurrence information message comprises a System Information Block (SIB) type 3 including information indicating whether the congestion occurs.

14. A mobile communication terminal for decreasing congestion, comprising:
   means for checking a service to receive, upon receiving a congestion occurrence information message from a Wideband Code Division Multiple Access (WCDMA) node B;
   means for switching a service cell mode of the mobile communication terminal from a WCDMA cell into a Global System for Mobile Communication (GSM)/General Packet Radio Services (GPRS) cell when the mobile communication terminal receives a circuit service and there is an available GSM/GPRS cell with which the mobile communication terminal can communicate.

15. A non-transitory computer-readable recording medium having recorded thereon a program for decreasing occurrence of congestion in a mobile communication terminal of a Wideband Code Division Multiple Access (WCDMA) system, comprising:
   a first code segment, for checking a type of a service to receive in the mobile communication terminal, upon receiving a congestion occurrence information message from a WCDMA node B;

a second code segment, for checking, when the service to receive is a circuit service, whether there is a Global System for Mobile Communication (GSM)/General Packet Radio Services (GPRS) cell available with which the mobile communication terminal can communicate; and a third code segment, for switching, when there is an available GSM/GPRS cell, a service cell mode of the mobile communication terminal from the WCDMA cell into the GSM/GPRS cell.

* * * * *